(12) United States Patent
McDermott (10) Patent No.: US 7,643,177 B2
(45) Date of Patent: *Jan. 5, 2010

(54) SYSTEM WITH A RANDOM NUMBER GENERATOR USED TO REMOVE CONTOURING IN CMOS IMAGER DATA HAVING AN EXTENDED DYNAMIC RANGE

(75) Inventor: Bruce C. McDermott, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/044,053

(22) Filed: Mar. 7, 2008

(65) Prior Publication Data

US 2008/0151085 A1    Jun. 26, 2008

Related U.S. Application Data

(62) Division of application No. 10/387,710, filed on Mar. 13, 2003, now Pat. No. 7,349,126.

(51) Int. Cl.
    *H04N 1/40* (2006.01)
(52) U.S. Cl. .................................... 358/2.1; 358/3.27
(58) Field of Classification Search ....... 358/3.03–3.05, 358/3.14–3.15, 3.27, 2.1; 382/199–200, 382/266–269
    See application file for complete search history.

(56) References Cited

U.S. PATENT DOCUMENTS

| 5,101,452 | A | 3/1992 | Tsai et al. |
| 5,896,469 | A | 4/1999 | Murakami |
| 6,040,876 | A | 3/2000 | Pettitt et al. |
| 7,349,126 | B2 * | 3/2008 | McDermott ................ 358/3.15 |

FOREIGN PATENT DOCUMENTS

| EP | 0270 259 A2 | 6/1988 |
| EP | 1 096 789 A2 | 5/2001 |
| EP | 1 096 790 A2 | 5/2001 |
| EP | 1458179 A2 * | 9/2004 |

* cited by examiner

*Primary Examiner*—Thomas D Lee
*Assistant Examiner*—Stephen M Brinich
(74) *Attorney, Agent, or Firm*—Nancy R. Simon

(57) ABSTRACT

The present invention is a method of image data processing that includes determining whether the image data indicates photodiode saturation, and removing contouring from the image data caused by the saturation. The contour artifact removal is accomplished by adding a random number to adjusted photodiode data from an extended range imager when the data from the imager indicates that the photodiode has been saturated. The adjusted photodiode data is a sum of photodiode data and spillover rate adjusted diffusion data.

1 Claim, 9 Drawing Sheets

SYSTEM WITH A RANDOM NUMBER GENERATOR USED TO REMOVE CONTOURING IN CMOS IMAGER DATA HAVING AN EXTENDED DYNAMIC RANGE

CROSS REFERENCE TO RELATED APPLICATIONS

This application is a divisional of U.S. application Ser. No. 10/387,710 filed Mar. 13, 2003, now U.S. Pat. No. 7,349,126 now allowed.

FIELD OF THE INVENTION

The present invention relates generally to the field of imaging, and in particular to imaging using an extended dynamic range imager. More specifically, the invention relates to removing a contour from the image data caused when a photodiode of the imager is saturated and charge spills into a floating diffusion region where recovering the full pixel value caused the contour.

BACKGROUND OF THE INVENTION

Imagers, particularly CMOS imagers, in the past have had problems with scenes that have a high dynamic range such that parts of the scene have highlights therein. In these portions of the image, the pixels of the sensor become saturated such that the digital pixel outputs are all 1's. To solve this problem, sensors have been designed for enhanced dynamic range. (See, for example, the extended dynamic range imagers discussed in European Patent Office Applications EP 1096789 A2 and EP 1096790 A2 and incorporated by reference herein). These sensors have a photo detector and a floating diffusion into which excess charge (that above photodiode saturation) is spilled. These extended range sensors output two values for each pixel, the photodiode value and a spillover value that indicates the rate of charge spillover from the saturated photodiode to the floating diffusion. These two different values are used to create the viewable image of the captured scene; when there is no spillover, the photodiode value is used; and when there is spillover, a new pixel value is created based on the sum of the photodiode value and the floating diffusion value multiplied by the ratio of the photodiode integration time to the floating diffusion integration time. As the ratio of the photodiode integration time to the floating diffusion integration time is increased, the magnitude of the multiplier increases. This multiplication causes a contouring artifact to appear in the resultant image. This is a drawback of the current state of the art.

For example, take the case where a photodiode of a conventional imager has a dynamic range of 8 photographic stops. This can be represented in a linear, binary system, with 8 bits of dynamic range. This corresponds to a system dynamic range of 48 db, for the photodiode. Also assume that the floating diffusion has a charge capacity (when transformed from rate of spillover information to pixel information), that represents an additional 5 stops of photographic range, and then this corresponds to an additional 5 upper significant bits of pixel information, 29 db additional dynamic range. The overall dynamic range of this system would be 13 bits, 13 photographic stops, and 77 db. To capture a picture with this imager, it is necessary to operate the imager with 200 lines of integration time for the photodiode and 25 lines of integration time for the floating diffusion. This means that to convert from floating diffusion rate of spillover data to pixel data the floating diffusion rate of spillover data must be multiplied by 8 (200 Lines Pd/25 Lines Fd) and then added to the photodiode data for that pixel, see equation 6 in application EP 1096789 A2.

Figure 1:
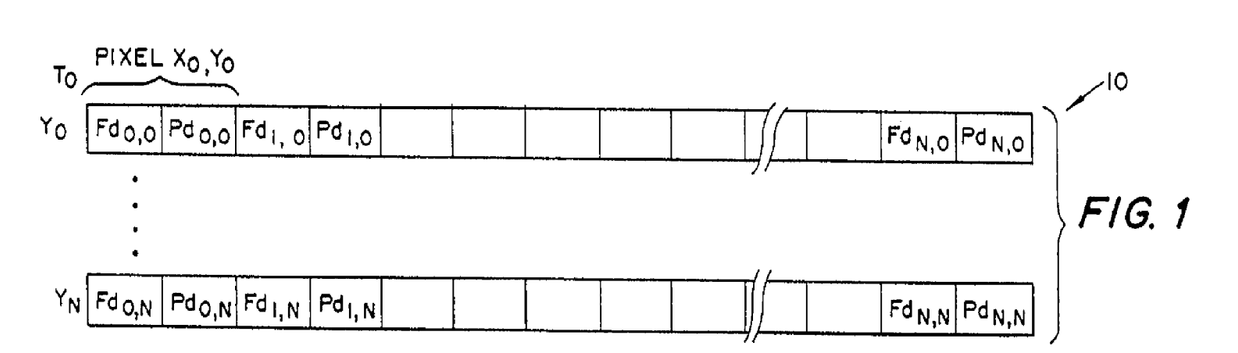
FIG. 1 depicts the format of pixel data produced by an extended dynamic range imager.

A typical Extended Dynamic Range (EDR) CMOS Imager with one output will output serial pixel digital data in a single channel 10. This imager provides two values per pixel as depicted in FIG. 1. The first value (Fd) is the signal representing the rate of charge spillover from the saturated photodiode to the pixel floating diffusion (if the light level is high enough to cause saturation of the photodiode). The second value (Pd) of the same pixel is the value on the pixel photodiode. When the photodiode is not saturated, the image information is the pixel value on the photodiode. The residual floating diffusion information in such a situation is the floating diffusion dark current and any signal resulting from of undesirable partial light sensitivity of the floating diffusion; this signal on the floating diffusion is also present when the photodiode is saturated.

Conventionally, a transform is used to convert from floating diffusion rate of spillover information and photodiode value, to pixel final numerical value (see, for example, equation 6 in application EP 1096789 A2). A new pixel final numerical value is created based on the sum of the photodiode value and the floating diffusion value multiplied by the ratio of the photodiode integration time to the floating diffusion integration time. The multiplication is done to convert from rate of floating diffusion spillover information to actual pixel value. When the photodiode is not bloomed (i.e. not saturated), the floating diffusion does not contain image information, and the pixel data is the photodiode data.

Typically, the pixel values are analog-to-digital (A/D) converted and the transform is implemented in digital logic or a digital signal processor. The multiplication by the ratio of the photodiode integration time to the floating diffusion integration time results in an image that has contouring in the high dynamic range areas of the image. The picture pixel information exists only in the sum of transformed floating diffusion information and the photodiode information What is needed is a system that will remove the contouring caused by multiplying the floating diffusion information by the ratio of the photodiode integration time to the floating diffusion integration time.

SUMMARY OF THE INVENTION

The present invention is directed to overcoming one or more of the problems set forth above. Briefly summarized, according to one aspect of the present invention, a method of image data processing includes determining whether the image data indicates photodiode saturation, and removing contouring from the image data caused by multiplying the floating diffusion information by the ratio of the photodiode integration time to the floating diffusion integration time. The contour removal is accomplished by adding a random number to the result of the floating diffusion value multiplied by the ratio of the photodiode integration time to the floating diffusion integration time when data from the imager indicates that the photodiode has been saturated.

The present invention utilizes a random number generator to remove the contouring caused when operating an active pixel CMOS imager in extended dynamic range mode. Typically the LSB values that signify the contents of the saturated photodiode are set to "1" because of the photodiode saturated condition. A contouring artifact is caused to appear in the resultant image due to the method used to combine the photodiode information with the floating diffusion information to form a final pixel value. The present invention removes the contouring artifact by adding a random number to the final pixel value. The number of bits of precision of the random number is determined by the multiplication factor used to convert the floating diffusion rate of spillover data to the final pixel data. In the above-discussed example, the multiplication factor is 8. (Multiplying by 8 causes the 3 least Significant bits of the result to be 0. This is the contour in the pixel data). The corresponding random number will have 4 (2^3) bits of precision. The random number generator and associated logic can be integrated on the same silicon substrate as the CMOS imager.

The above and other objects of the present invention will become more apparent when taken in conjunction with the following description and drawings wherein identical reference numerals have been used, where possible, to designate identical elements that are common to the figures.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantages discussed below.

The current state of the art suffers from a drawback. The current state of the art provides two values per pixel. The first value is the signal representing light integrated on the pixel photodiode. The second value is the value on the floating diffusion. When the photodiode is bloomed, the floating diffusion value represents the RATE of charge spillover from the photodiode to the floating diffusion. A transform is used to convert from rate of spillover information, and photodiode value, to pixel final numerical value. Since the photodiode is bloomed (saturated) the numerical value of the photodiode portion of the final pixel value is at maximum (At or close to all 1's). Typically the pixel values are analog to digital converted and the transform is implemented in digital logic or a digital signal processor. The conversion of the floating diffusion rate of charge spillover value to final pixel value results in an image that has contouring. The picture information exists only in the transformed floating diffusion information, and in the fact that the photodiode is saturated, indicating that the floating diffusion transformed value plus the photodiode saturated value is to be used as the final pixel value in image processing. The present invention advantageously utilizes a random number generator to remove the contouring caused by the floating diffusion transformed value portion.

The present invention advantageously improves image quality of images captured by extended dynamic ranger imagers.

The present invention also advantageously provides image data that produces a more pleasing image having an extended dynamic range.

DETAILED DESCRIPTION OF THE INVENTION

In the following description, the present invention will be described in the preferred embodiment as hardware. Those skilled in the art will readily recognize that the equivalent of such hardware may also be constructed in software.

The present invention utilizes a random number generator to remove the contouring caused when operating the conventional extended dynamic range active pixel CMOS imager and the photodiode/photodetector becomes saturated. The present invention removes the contouring artifact by adding a random number to the final pixel value formed by adding the floating diffusion rate of spillover value, multiplied by the ratio of the photodiode integration time to the floating diffusion integration time, to the photodiode value. A random number generator and associated logic can be integrated on the same silicon substrate as the CMOS imager. Alternately, this invention may be executed utilizing software and a microprocessor (see FIG. 11).

Figure 2:
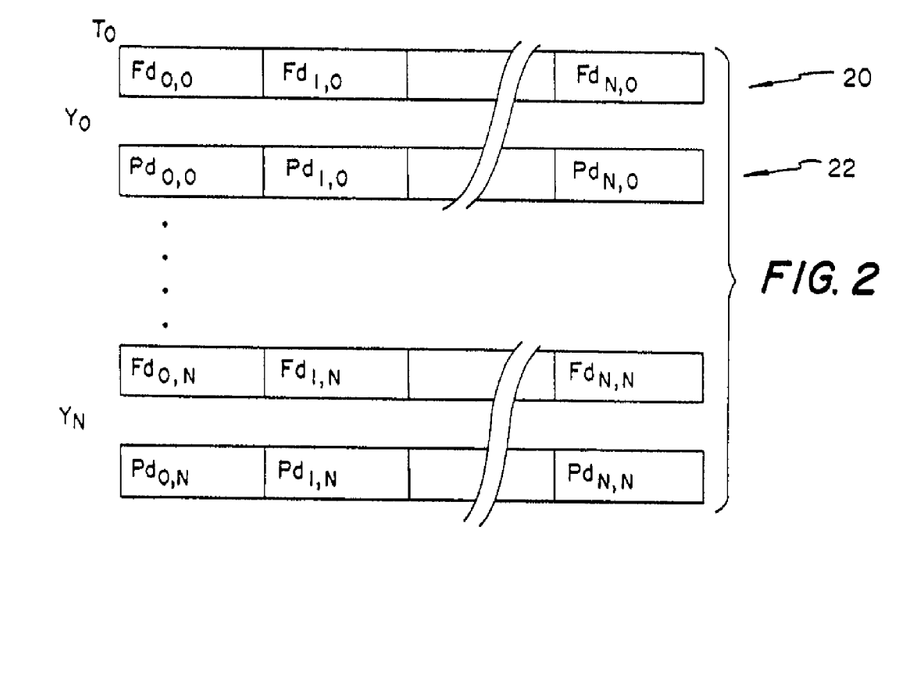
FIG. 2 shows the conversion of the imager pixel data into parallel streams of diffusion data (Fd) and photodiode data (Pd).
Figure 3:
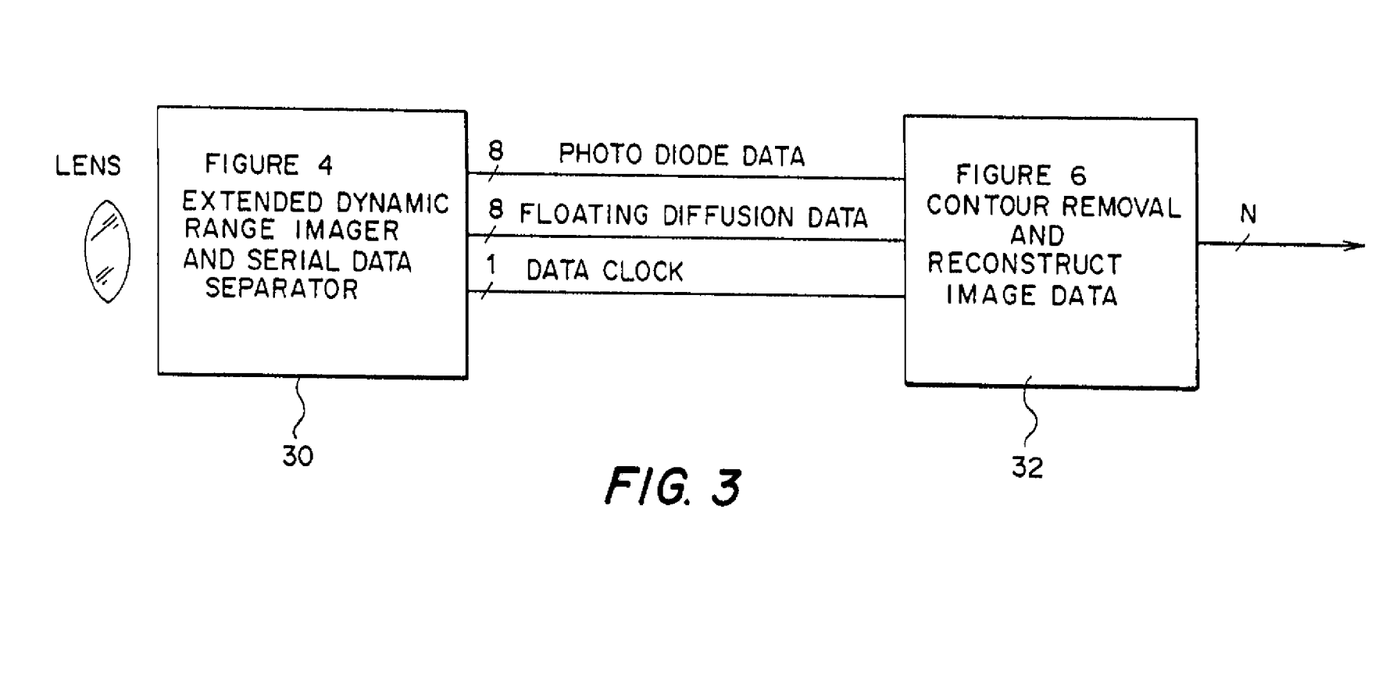
FIG. 3 is a block diagram of the circuits of a hardware embodiment of the present invention.

To facilitate the addition of a random number to the pixel value in hardware, the data is first converted from serial data to parallel data as depicted in FIG. 2 where a first channel 20 includes the diffusion data (Fd) and a second channel 22 includes corresponding photodiode data (Pd). A serial data separator circuit 30, as depicted in FIG. 3, accomplishes this conversion. The converted data then has the contour artifact removed and the transformed data is then reconstructed into serial image data as in FIG. 1 by a contour removal and reconstruction circuit 32 also shown in FIG. 3. The contour corrected pixel data is then further processed to create an image, which involves the storage of the pixel data in an image memory.

Figure 4:
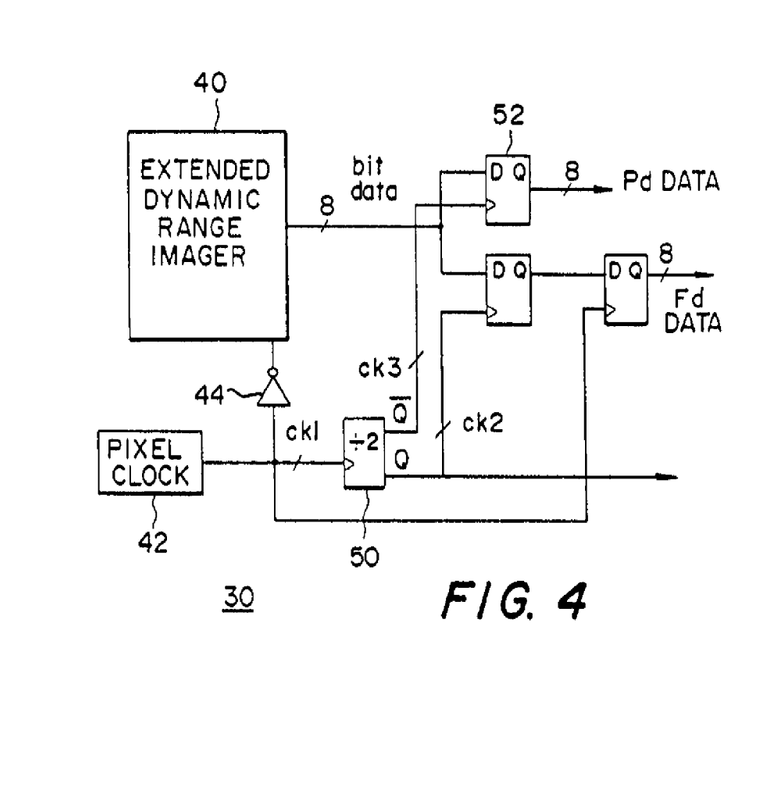
FIG. 4 illustrates the separator circuit 30 of FIG. 3 in more detail.
Figure 5:
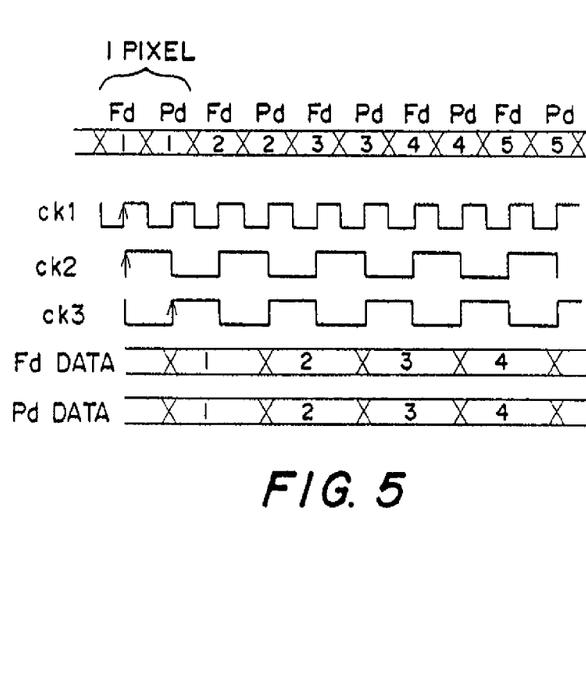
FIG. 5 is a timing diagram for the circuit 30 of FIG. 4.

Depicted in more detail in FIG. 4 are the components of the separator circuit 30. The separator 30 operates to arrange, parallel in time, that the pixel floating diffusion data and the pixel photodiode data exist simultaneously for the respective final pixel value. FIG. 5 depicts the clock and data signals of the components of FIG. 4. The serial pixel data (Fd, Pd) arrives from the imager 40 responsive to a pixel clock signal ck1 supplied to the imager 40 by a clock signal source 42 through an inverter 44. The diffusion data (Fd) is clocked through storage registers 46 and 48 responsive to the pixel clock signal and a subdivided clock signal ck2 supplied by divider 50. The pixel data (Pd) is clocked through register 52 by clock signal ck3.

Figure 6:
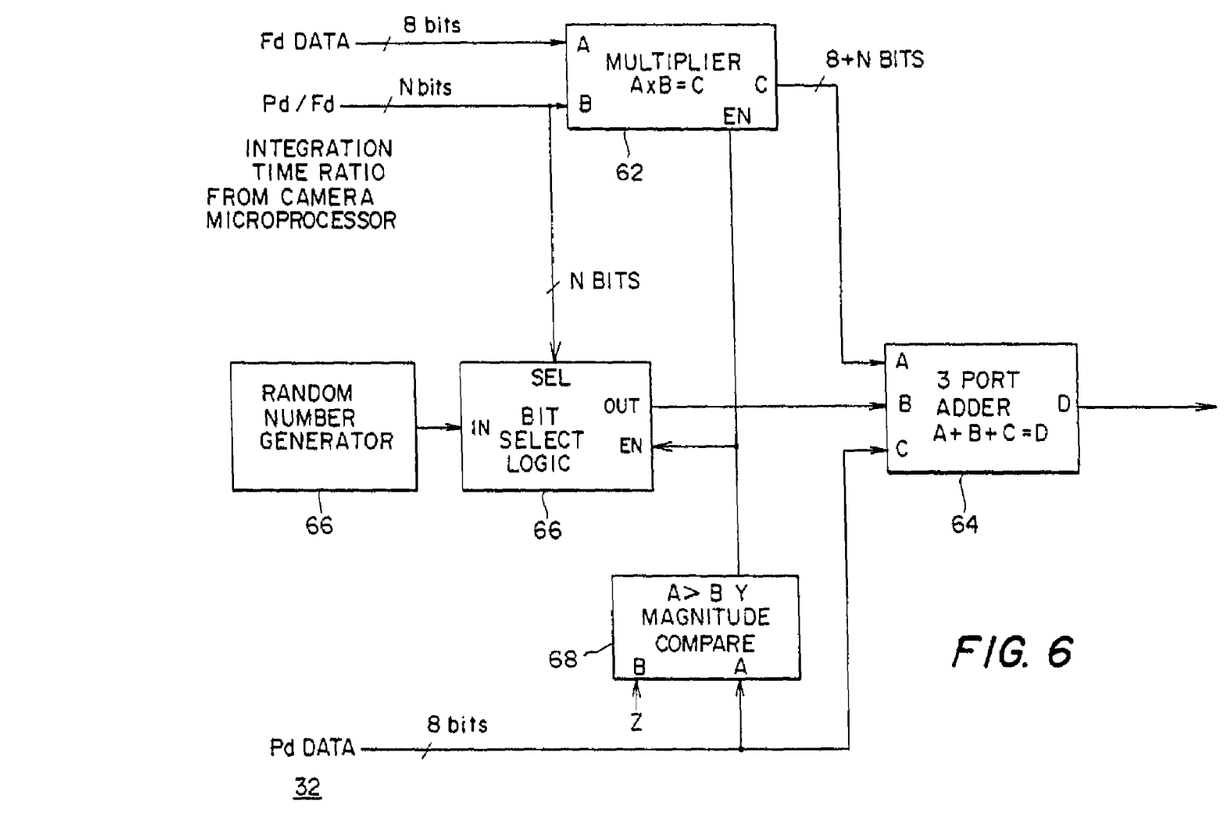
FIG. 6 illustrates the contour removal and reconstruction circuit 32 of FIG. 3 in more detail.

The parallel pixel data (Pd) and diffusion data (Fd) is supplied to the contour artifact removal and reconstruction circuit 32 shown in more detail in FIG. 6. This circuit 32 adds a random number generated by a random number generator 66 to the final pixel value, if the magnitude of the associated photodiode value is at, or close to, saturation. The random number can be generated in a number of different ways such as that described in U.S. Pat. No. 5,101,452, incorporated by reference herein. The diffusion data Fd is supplied to a two-port multiplier 62. The second input to the multiplier 62 is the numerical representation of the ratio of the photodiode integration time to the floating diffusion integration time. In a camera, this information would typically come from the microprocessor, or digital signal processor, that executes the image exposure algorithm. The multiplier 62 has a third input, the enable. When the enable is a 1 the multiplier 62 outputs the product of the floating diffusion spillover data and the integration time ratio. When the enable is a 0 the multiplier 62 outputs a 0. The multiplier 62 enable is connected to the output of a magnitude comparator 68. The magnitude comparator 68 is used to establish the photodiode saturation threshold. The variable Z is a constant that can be all 1's or a smaller number and is used to accommodate the situation where the photodiode has a soft saturation. The floating diffusion spillover may start before the photodiode is completely saturated. The multiplier 62 output is connected to the A input port of a three port adder 64. The B input port of the three-port adder 64 is connected to the output of the bit select logic or selector 66. The bit select logic performs two functions. First, it selects how many bits of the random number generator 66 to add to the sum of the photodiode pixel value and the product of the integration time ratio and the floating diffusion spillover pixel data. This is accomplished with the select inputs to the bit select logic 66. In the previously discussed example, the gain ratio was 8. In this situation 8 is 2^3. Four (4) bits of random noise (starting from the least significant bit) are required to remove the contour caused by multiplying the floating diffusion spillover data by 8. The second function of the bit select logic is to gate the random number source off when the photodiode is not saturated. This is accomplished with the enable input of the bit select logic 66. This data reconstruction circuit 32 preferably implements the method of equation 6 of EP 1096789 previously mentioned either in hardware as discussed above or through software, such as a look-up table. In this equation, when blooming occurs, the reconstructed pixel value is the saturated photodiode signal plus the product of the floating diffusion spill over signal and the ratio of the photodiode integration time to the floating diffusion integration time. When blooming does not occur, the photodiode data is the pixel data.

Take the case where the scene has very bright highlights that need to be captured as part of the picture. Typically, an appropriate photodiode integration time is used to capture the scene, not including the highlights. The floating diffusion integration time is chosen such that the floating diffusion signal is close to, but not, saturated, in the highlight areas of the scene. Since the light in the highlight areas is high, the spillover rate onto the floating diffusion is high. The integration time of the floating diffusion will be short. An example might be 200 lines of integration time for the photodiode and 25 lines of integration time for the floating diffusion. According to equation 6 of EP 1096789 we multiply the floating diffusion value by 200/25 and add it to the photodiode data to obtain the final pixel value. This final pixel value is quantization precision limited by the ratio of the photodiode integration time to the floating diffusion integration time, the multiplier. For each factor of 2-multiplier increase, the data looses a least significant bit (LSB) of quantization precision, (binary). This is classic imager contouring. The present invention adds a random number to remove the apparent contouring in the resultant image. The bit depth of the random number is determined by the ratio of the photodiode integration time to the floating diffusion integration time. Therefore the new equation becomes:

$$V_{eff} = V_{out}$$

for $V_{out} < V_{pdsat}$ $$V_{eff} = V_{pdsat} + (V_{out} - V_{pdsat})(T_{pdint}/T_{fdint}) + \text{Random Value}$$

for $V_{out} >= V_{pdsat}$ \hfill (1)

where Veff is the final pixel data, Vout is the total voltage available from the pixel, (if it had not saturated), Vpdsat is the photodiode saturation voltage, Tpdint is the integration time of the photodiode and Tfdint is the integration time of the floating diffusion region.

The magnitude comparator 68 can alternately be connected to the floating diffusion data. The floating diffusion information could contain dark current and/or the floating diffusion may be slightly light sensitive. This light sensitivity is an undesirable behavior. The magnitude comparator can cause equation 1 data reconstruction if the floating diffusion information is greater than some minimum value. This minimum value represents the dark current and the undesired light sensitivity signal and can be called a non-spillover threshold.

Figure 7:
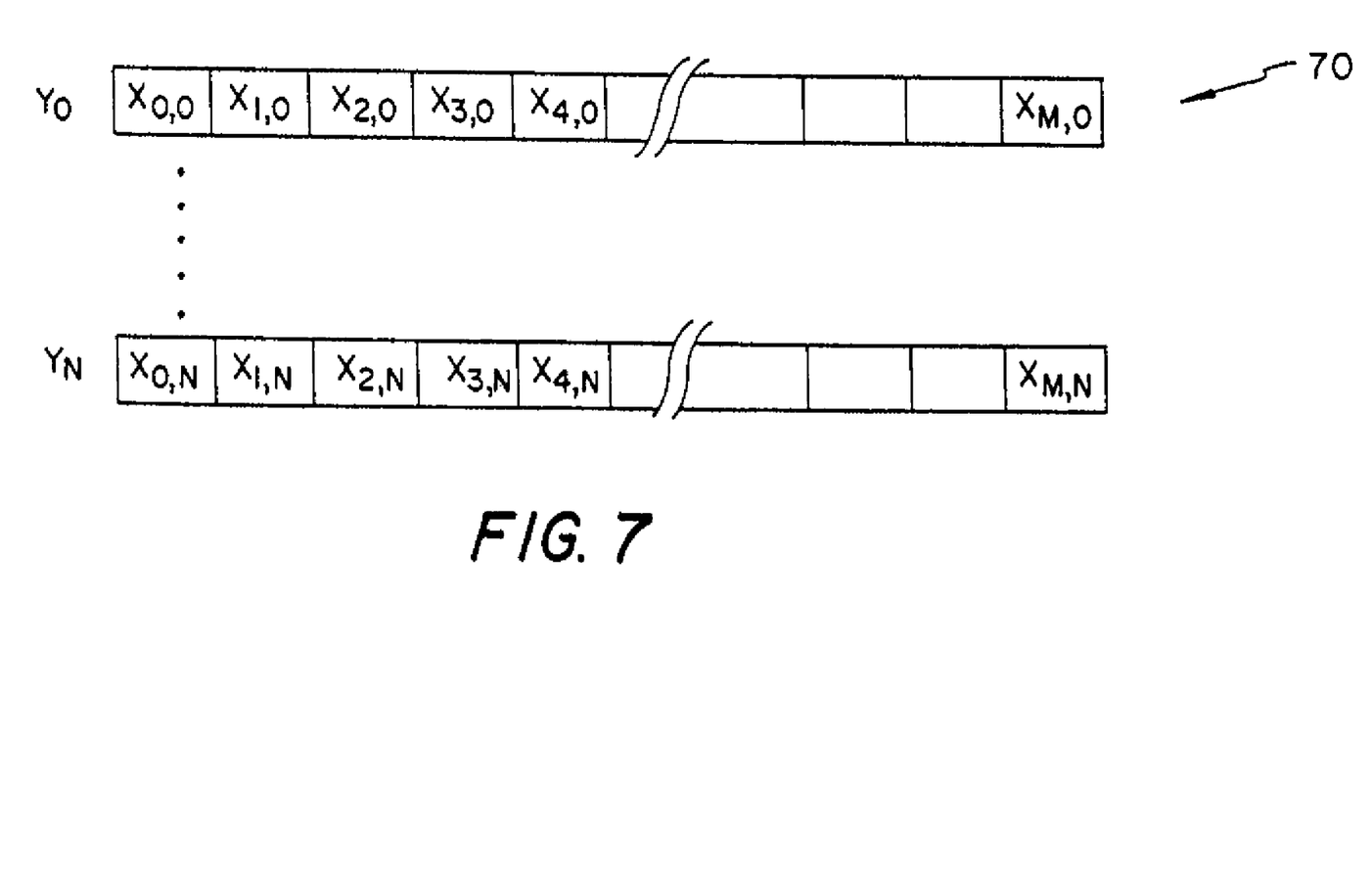
FIG. 7 depicts the format of output image data.
Figure 8:
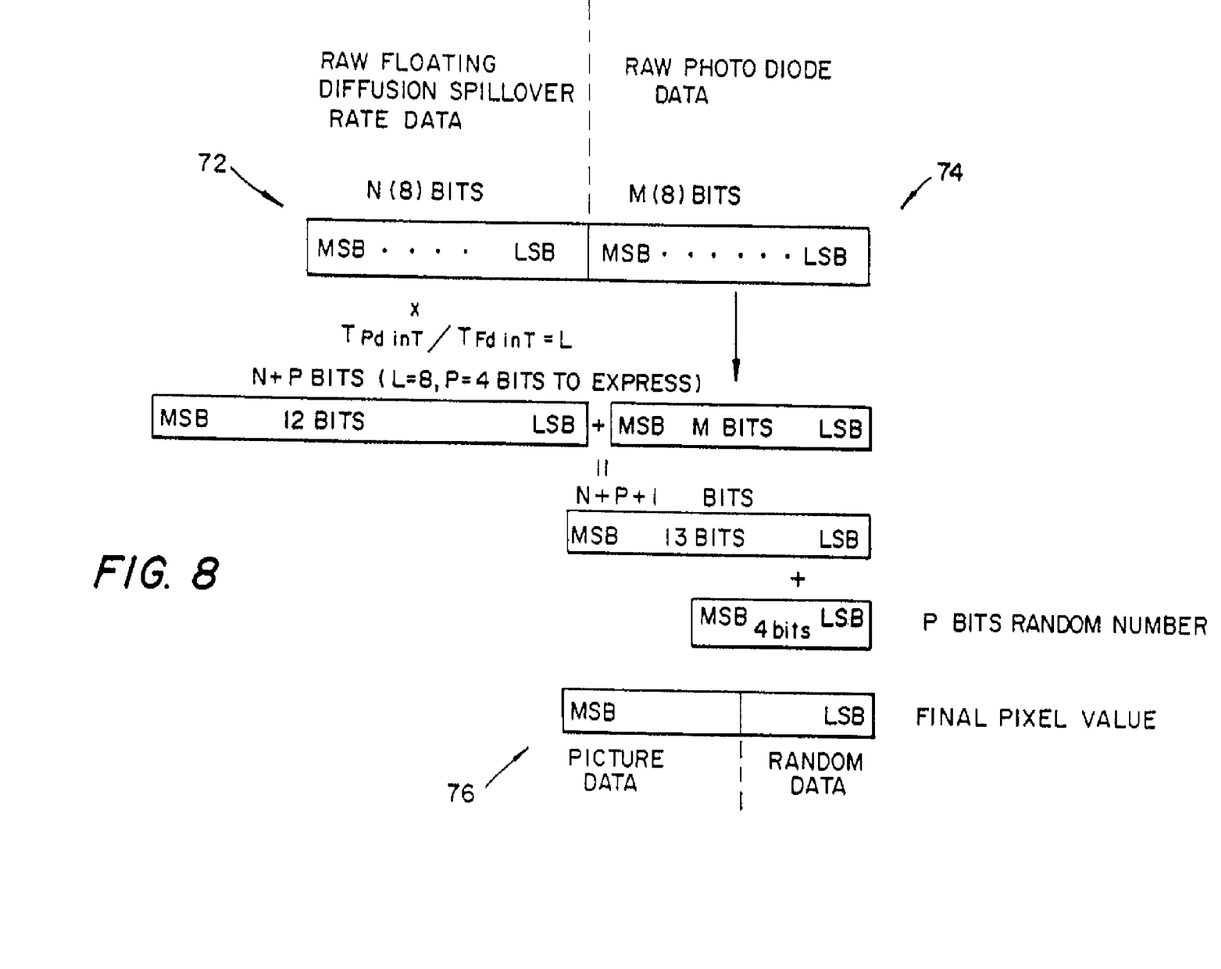
FIG. 8 shows how diffusion and photodiode data are combined.

FIG. 7 graphically illustrates the image data 70 that is the output from the circuit of FIG. 6. This data has one value per pixel and has a possible numerical range greater than that of the photodiode information. In this illustration, the floating diffusion spillover value has 8 bits precision. The photodiode data has 8 bits in precision. The resultant data will have precision of 8 bits+8 bits+N bits, where N bits represents the number of bits used to express the ratio of the photodiode integration time to the floating diffusion integration time. The combination of the floating diffusion data (Fd) 72 and the pixel data (Pd) 74, through the use of equation 1, to produce a pixel 76 is depicted graphically in FIG. 8.

Figure 9:
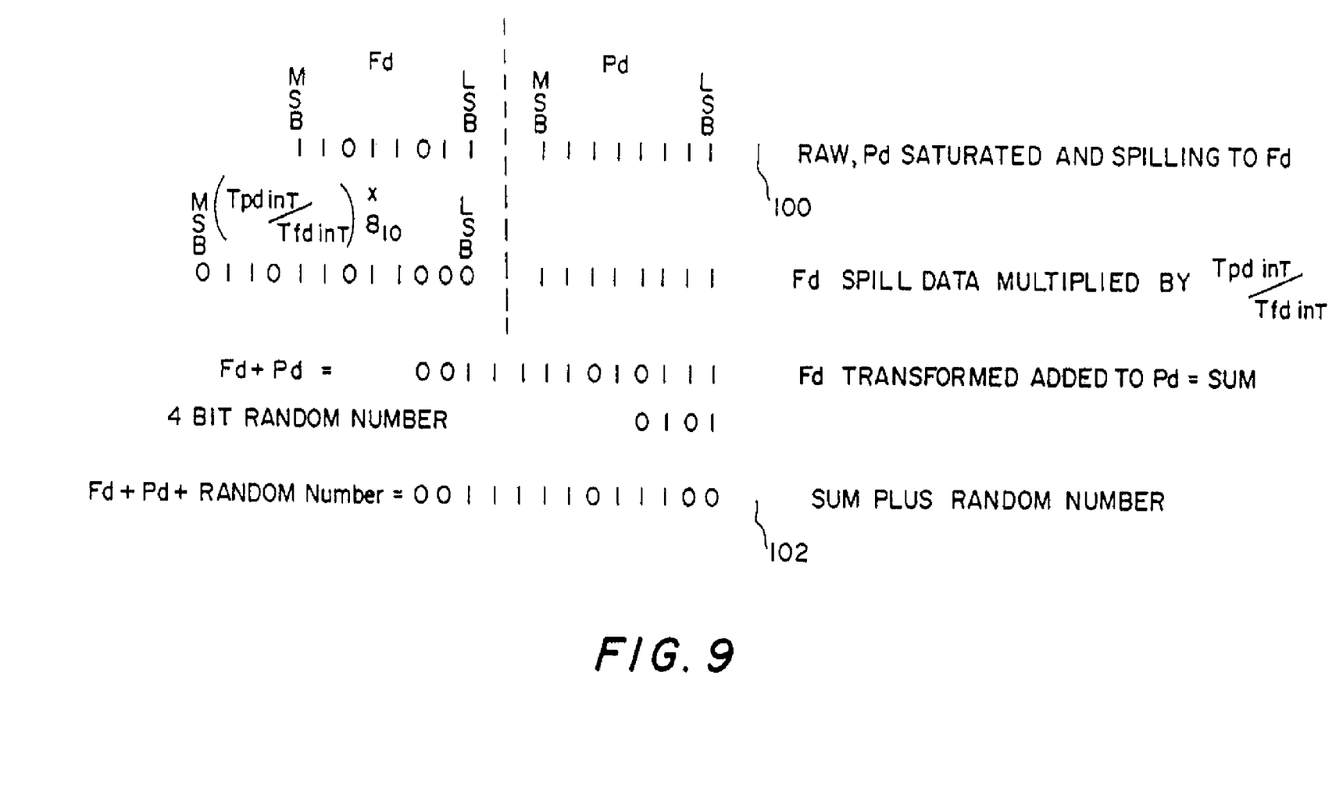
FIG. 9 depicts the conversion or transformation of pixel data when photodiode saturation occurs.

FIG. 9 shows the binary transformation of a typical pixel value that has an amplitude that is high enough such that the floating diffusion data (Fd) is transformed and a random number is added to the data. This example represents 8 bits of photodiode data and 8 bits of floating diffusion data. The upper pixel value 100 is the data from the imager and the lower pixel value 102 is the data after randomization. This data structure used to control the production of an image by a computer includes the floating diffusion data, the saturated photodiode data, and the random number when saturation of the photodiode has occurred.

Figure 10:
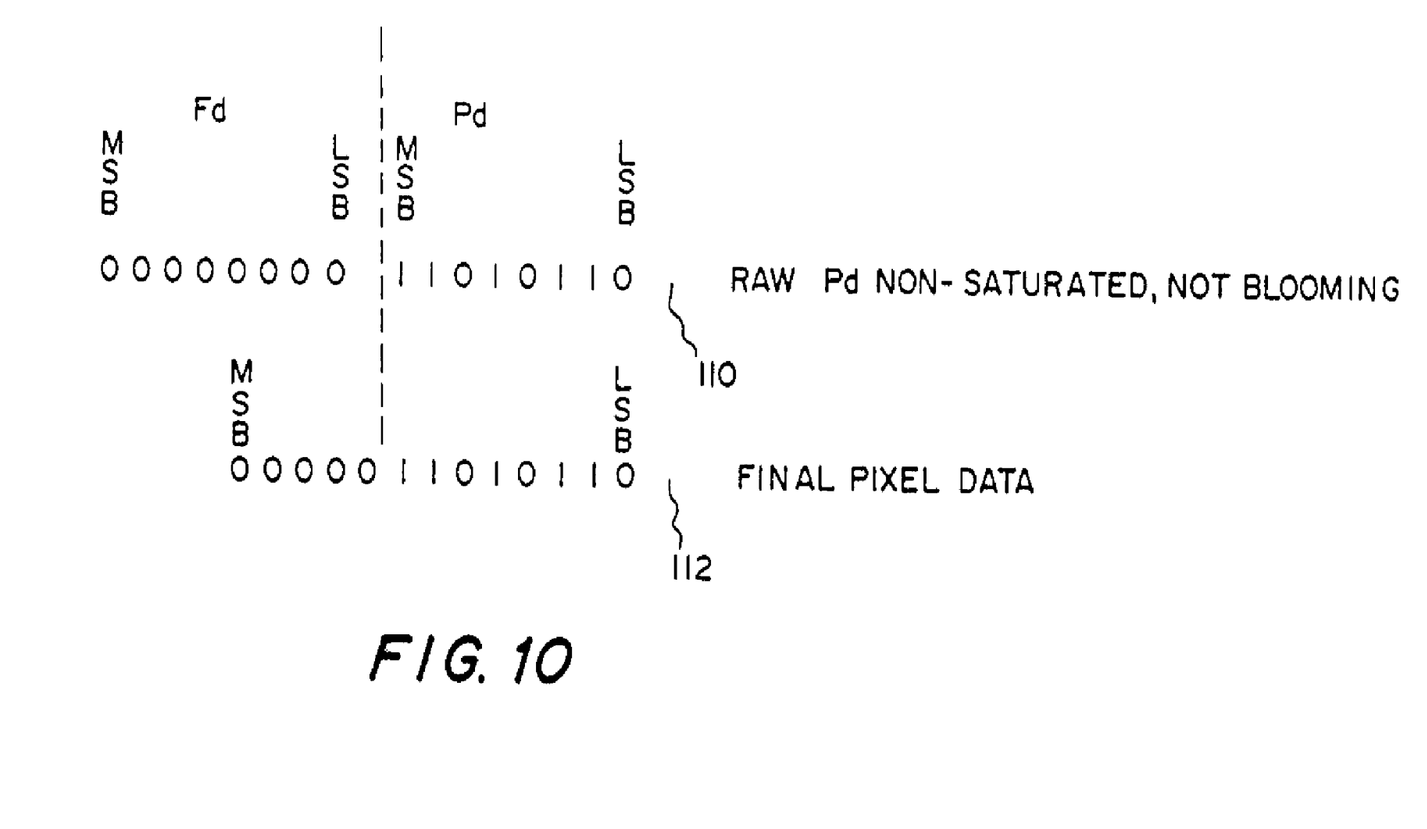
FIG. 10 depicts the pixel data when photodiode saturation does not occur.

FIG. 10 shows the binary transformation (or lack thereof) of a typical pixel value that has an amplitude that is not high enough for the floating diffusion data (Fd) to be transformed and a random number to be substituted for the photodiode data. The photodiode data (Pd) becomes the raw pixel data. This example also represents 8 bits of photodiode data and 8 bits of floating diffusion data. The upper pixel value 110 is the data from the imager and the lower pixel value 112 is the data after it passes through the circuits of the present invention. In this data structure the least significant bits are photodiode data. This is an idealized illustration. In practice the floating diffusion information contains dark current and possibly a small signal due to undesired light sensitivity. The present invention as discussed above does not address this issue since the magnitude comparator 68 decides when to process floating diffusion data responsive to or based on photodiode data, not floating diffusion data. The issue is addressed below.

Figure 11:
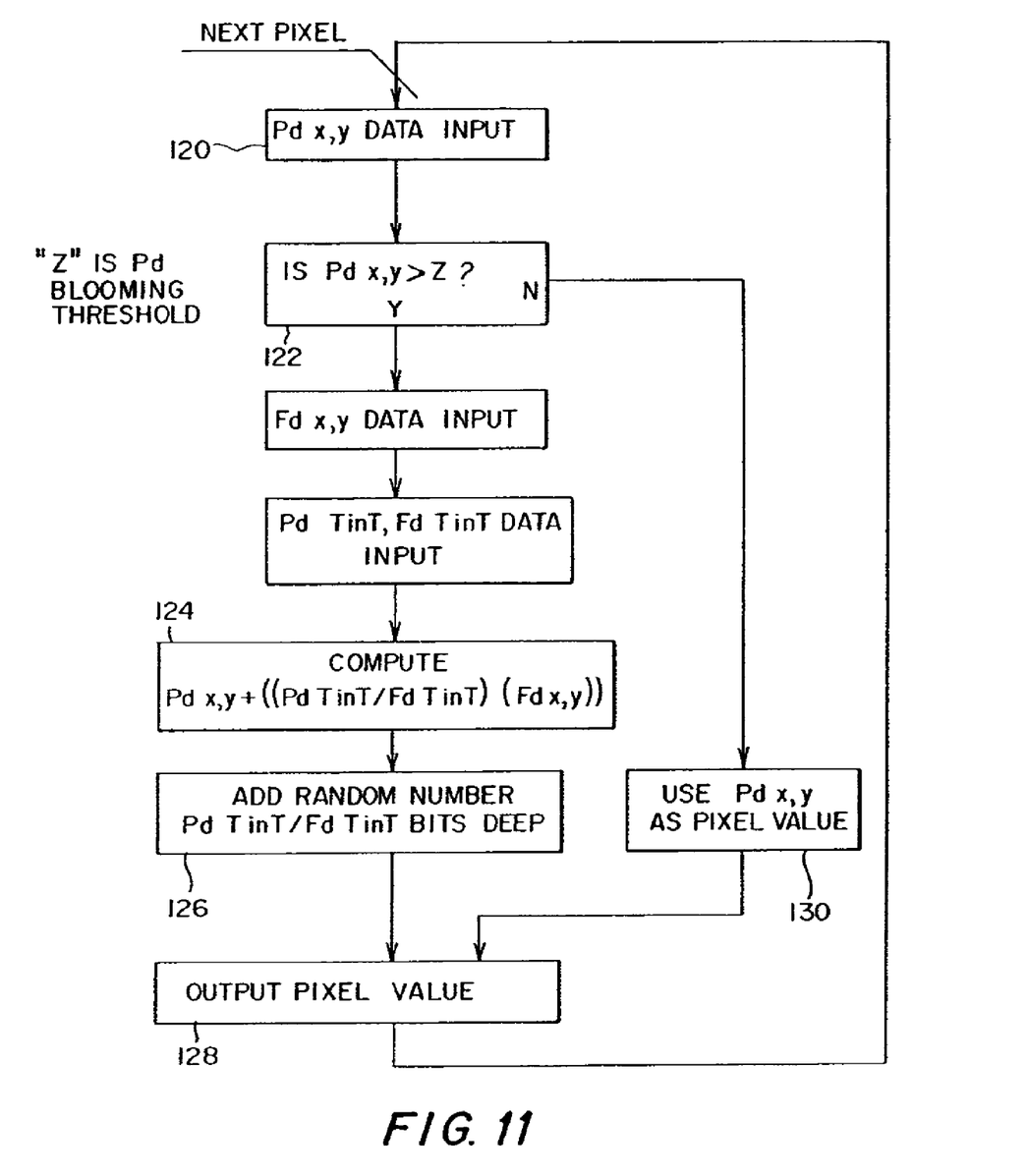
FIG. 11 is a flowchart of a software embodiment of the present invention.

As previously mentioned, the contour removal of the present invention can be accomplished via software using a microprocessor and a flowchart showing the operations of such software is depicted in FIG. 11. When the photodiode data is input 120, a determination is made 122 whether the photodiode data indicates that a spillover into the floating diffusion region has occurred using a blooming threshold Z compared to the photodiode data. If so, a calculation 124 is performed that adds the floating diffusion rate of spillover value, multiplied by the ratio of the photodiode integration time to the floating diffusion integration time, to the photodiode value. A random number is added 126 to remove the apparent contouring in the resultant image, caused by the multiplier in the prior calculation. The bit depth of the random number is determined by the number of bits it takes to express the ratio of the photodiode integration time to the floating diffusion integration time. The reconstructed pixel data is then output 128. If the photodiode data indicates that a spillover into the floating diffusion region has not occurred, then the photodiode data is output 130 as the pixel data.

Note that the operations 124 and 126, and the equivalent operations in the hardware version, can be accomplished by using a look-up-table (LUT) that has as inputs the floating diffusion data, the photodiode data and the random number.

In the present invention, if the floating diffusion is not partially light sensitive, it is possible to connect the magnitude comparator to the floating diffusion spill over data source instead of the photodiode data source. Alternately an OR gate could be used, in place of the magnitude comparator, with the floating diffusion data, skipping a few least significant bits (LSB's), to allow for dark current accumulation.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The invention has been described with reference to a preferred embodiment. However, it will be appreciated that variations and modifications can be effected by a person of ordinary skill in the art without departing from the scope of the invention.

PARTS LIST

10 serial pixel data
20, 72 floating diffusion data
22, 74 photodiode data
30 serial data separator circuit
32 contour removal and reconstruction circuit
40 imager
42 clock signal source
44 inverter
50 divider
52 register
62 multiplier
64 adder
66 random number generator
68 comparator
70 output image data
76 output pixel
100, 110 upper pixel value
102, 112 lower pixel value
120-130 software operations

What is claimed is:

1. A computer readable medium encoded with a data structure for controlling production of an image by a computer, the data structure comprising pixel data used by the computer to remove contouring from the image, wherein the computer-generated pixel data is represented by a sum of spillover rate adjusted diffusion data and photodiode data and a randomly generated number.

* * * * *